Patented Nov. 2, 1926.

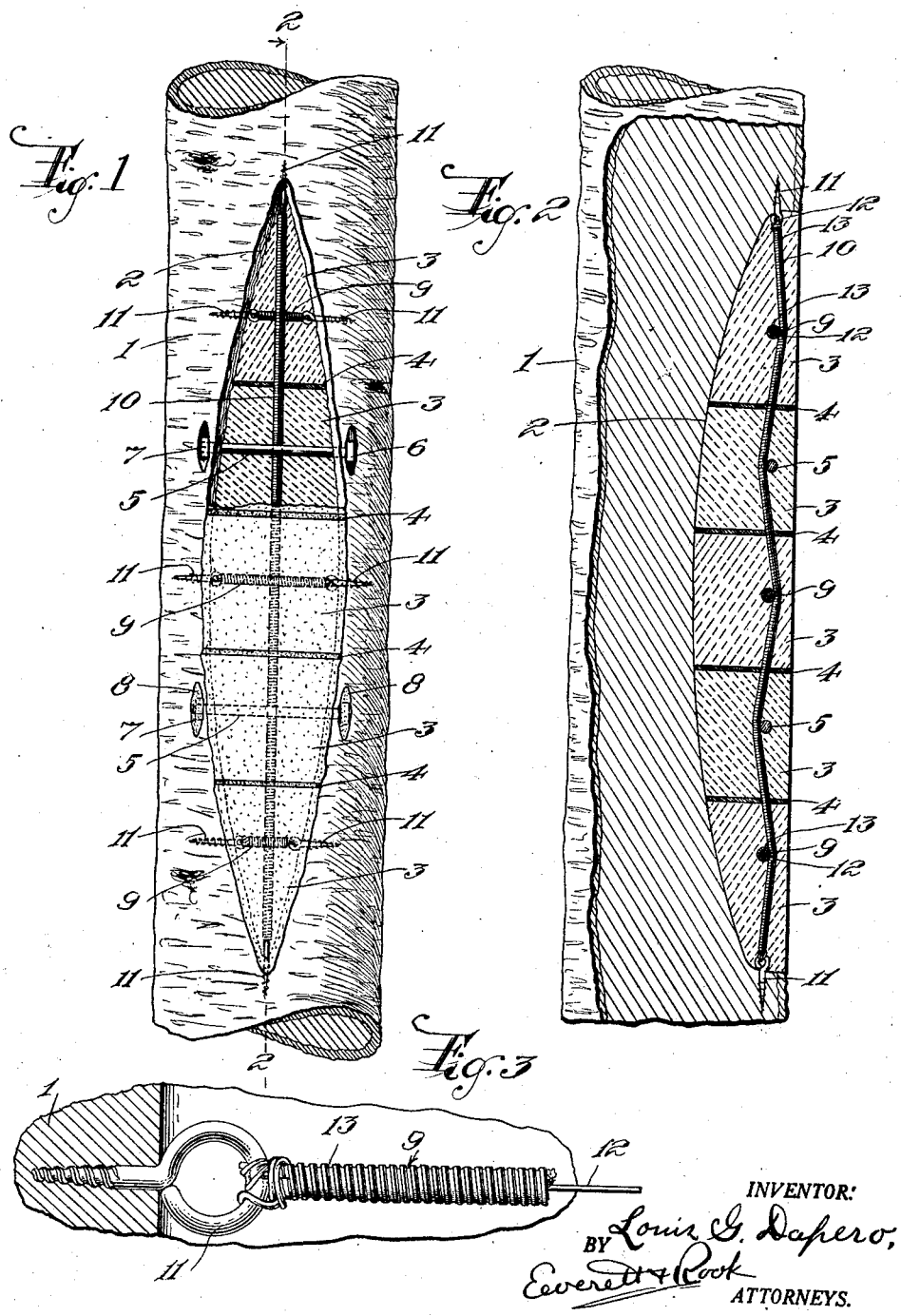

1,605,517

UNITED STATES PATENT OFFICE.

LOUIS G. DAPERO, OF SUMMIT, NEW JERSEY.

TREE FILLING AND PROCESS OF FILLING TREE CAVITIES.

Application filed January 16, 1925. Serial No. 2,794.

The objects of this invention are to provide for cavities which are elongated longitudinally of tree trunks a filling which shall permit swaying of the tree, such as caused by wind, without fracturing the filling or causing leakage; to provide a sectional filling whose adjacent sections shall imperviously connect with one another so that no moisture can work in between them; to provide an elastic material for joining adjacent sections of the tree filling and permitting slight relative motion thereof without leakage; to utilize for this purpose a composition of rubber; to provide an improved flexible staying means for extending across the tree cavity, and to obtain other advantages and results as may be brought out by the following description.

Referring to the accompanying drawing, in which the same numerals of reference designate corresponding and like parts throughout the several views, Figure 1 is a front elevation of a portion of a tree trunk having a filling illustrating my invention, said filling being partly in section to exhibit the stay wires, bolts, etc.;

Figure 2 is a longitudinal central section of the tree trunk and filling on line 2—2, Fig. 1, and Figure 3 is a detail view of a stay wire employed to permit yielding of the filling.

In the specific embodiment of the invention shown in the drawings, 1 indicates a tree trunk having a cavity 2, caused by decay or the like, which has in any suitable manner been cleaned out and its interior surface prepared for filling. According to my invention the filling comprises sections 3 of cement connected by elastic layers 4 extending transversely of the tree trunk 1, the filling as a unit being built up within the cavity 2 as hereinafter described.

Before the cavity is filled, however, cross-bolts 5 to any necessary or desired number are applied to hold the opposite longitudinal walls of the cavity 2 together, the heads 6 and nuts 7 of the bolts being preferably sunken in the wood and covered with cement 8 as usual. Cross-stays 9 are also applied to said walls, preferably in alternating relation to the bolts 5, and a longitudinal stay 10 extends longitudinally of the cavity preferably in interwoven relation to the cross-bolts 5 and cross-stays 9, as shown in the drawing. Both the cross-stays 9 and the longitudinal stay 10 are anchored at their ends by screw eyes 11 driven into the wood and each of said stays is shown comprising a wire 12 extending loosely through a flexible metal casing 13 such as is commonly used for gas tubes, and so forth, see Figure 3. The wire 12 is securely made fast at its ends to the screw eyes 11 and preferably the casing 13 is similarly secured at its ends, said casing ensuring enough space around the wire 12 so that it can always bend or yield laterally and so accommodate itself to the swaying of the tree.

After the said cross-bolts 5 and stays 9 and 10 are inserted in the cavity, the filling is built up, commencing at the lower end of the cavity and tamping the first section 3 of cement into place as shown. Then an elastic layer 4 is inserted consisting of a rubber composition which will adhere closely and firmly to the cement section 3 and yet yield without parting as the tree sways in the wind. Any elastic composition which is suitable for these purposes can be employed, but I have found raw rubber combined with rubber cement to give very good results. The top of the cement section 3 is warmed, as by a blow torch, and a layer of rubber cement spread on to which raw rubber is applied in the form of a sheet cut to fit the cavity and then more rubber cement, and any desired number of such alternate layers can be built up, the top one being rubber cement. Another building cement section 3 is then started, but no more building cement is put on at first than can be warmed, as by a blow torch, so as to adhere firmly to the rubber cement. When this has been accomplished, the rest of the second section 3 is built up and another layer 4 of yielding composition applied as before. This process is continued until the entire cavity is filled, and preferably the sections are so disposed that one of the cross-members is in each section, as clearly shown in Figures 1 and 2. The filling when completed is of a unitary piece and yet it can bend or yield sufficiently to accommodate the swaying of the tree; at the same time, there are no crevices or spaces for water to enter between the various sections of the filling and thus the filling will last indefinitely without decay starting again.

Various forms and compositions of the sections 3 and intermediate layers can be made without departing from the spirit and scope of my invention so long as the entire filling is a unitary piece with said sections and layers adhering firmly together, so that no moisture can creep in between the sections and layers, and at the same time said layers are sufficiently yielding so that the tree filling can bend and twist slightly to permit the natural swaying of the tree without injury to the filling, such as would cause moisture to creep in through or under the filling and start decay of the tree trunk anew. Any equivalent means of accomplishing this result may be employed by those skilled in the art; and therefore I do not wish to be understood as limiting myself except as required by the following claims when construed in the light of the prior art.

Having thus described the invention, what I claim is:

1. A tree filling composed of a plurality of non-elastic sections imperviously connected by elastic material between them.

2. A tree filling composed of a plurality of sections imperviously connected by rubber composition between them.

3. A tree filling composed of a plurality of sections of unyielding material imperviously connected by elastic material between them.

4. A tree filling composed of a plurality of sections of cement imperviously connected by elastic material between them.

5. A tree filling composed of a plurality of sections of cement imperviously connected by rubber composition between them.

6. A process of filling tree cavities which consists in building up in a cavity a section of non-elastic material, forming on the top of said section a layer of elastic material imperviously connected to said section, and building on said layer another section of non-elastic material also imperviously connected to said layer, whereby the entire filling is a unitary structure impervious to moisture and yet can bend to accommodate swaying of the tree.

7. A process of filling tree cavities which consists in building up in a cavity a section of unyielding material, forming on the top of said section a layer of yielding material imperviously connected to said section, and building on said layer another section of unyielding material also imperviously connected to said layer, whereby the entire filling is a unitary structure impervious to moisture and yet can bend to accommodate swaying of the tree.

8. A process of filling tree cavities which consists in building up a cement section in a cavity, forming on the top of said section a layer of elastic material imperviously connected to said section, and building on said layer another cement section imperviously connected to said layer, whereby the entire filling is a unitary structure impervious to moisture and yet can bend to accommodate swaying of the tree.

9. A process of filling tree cavities which consists in building up in a cavity a section of material, forming on the top of said section a layer of rubber composition imperviously connected to said section, and building on said layer another section of material also imperviously connected to said layer, whereby the entire filling is a unitary structure impervious to moisture and yet can bend to accommodate swaying of the tree.

10. A process of filling tree cavities which consists in building up a cement section in a cavity forming on the top of said section a layer of rubber composition imperviously connected to said section, and building on said layer another cement section imperviously connected to said layer, whereby the entire filling is a unitary structure impervious to moisture and yet can bend to accommodate swaying of the tree.

11. A process of filling tree cavities which consists in building up a section in a cavity, applying to the end of said section a layer of rubber with rubber cement at its opposite sides, and building on said layer another section, whereby said rubber is imperviously connected to both said sections.

12. A process of filling tree cavities which consists in building up a cement section in a cavity, warming the end surface of said section and applying thereto a layer of rubber with rubber cement at its opposite sides, applying building cement to said layer and warming the same until it adheres, and completing a cement section on said building cement.

13. An improved stay member for tree cavities consisting of a wire, means for attaching the ends of said wire to the walls of the tree cavity, a flexible metal casing loosely enclosing said wire so as to have a limited lateral movement independent thereof, and a filling in which said casing is embedded.

14. In a tree cavity filling composed of a plurality of sections movable with respect to each other, a flexible metal casing extending through said sections, a wire loose in said casing to permit a limited independent lateral movement, and means for attaching the ends of said wire to the walls of the cavity.

15. In a tree cavity filling composed of a plurality of sections imperviously connected by elastic material between them, a flexible metal casing extending through said sections and their elastic connection, a wire loose in said casing to permit a limited independent lateral movement, and means for attaching the ends of said wire to the walls of the cavity.

LOUIS G. DAPERO.